United States Patent
Hoerentrup

(10) Patent No.: US 10,332,299 B2
(45) Date of Patent: Jun. 25, 2019

(54) SCENE GRAPH FOR DEFINING A STEREOSCOPIC GRAPHICAL OBJECT

(75) Inventor: Jobst Hoerentrup, Wennigsen (DE)

(73) Assignee: THOMSON LICENSING, Issy les Moulineaux (FR)

( * ) Notice: Subject to any disclaimer, the term of this patent is extended or adjusted under 35 U.S.C. 154(b) by 105 days.

(21) Appl. No.: 14/004,704

(22) PCT Filed: Mar. 19, 2012

(86) PCT No.: PCT/EP2012/054761
§ 371 (c)(1),
(2), (4) Date: Sep. 12, 2013

(87) PCT Pub. No.: WO2012/130650
PCT Pub. Date: Oct. 4, 2012

(65) Prior Publication Data
US 2014/0002451 A1    Jan. 2, 2014

(30) Foreign Application Priority Data
Mar. 31, 2011    (EP) .................................... 11305373

(51) Int. Cl.
*G06T 15/00*    (2011.01)
*G06T 17/00*    (2006.01)
*G11B 27/32*    (2006.01)

(52) U.S. Cl.
CPC ............ *G06T 15/00* (2013.01); *G06T 17/005* (2013.01); *G11B 27/322* (2013.01); *G06T 2210/61* (2013.01); *G11B 2220/2541* (2013.01)

(58) Field of Classification Search
None
See application file for complete search history.

(56) References Cited

U.S. PATENT DOCUMENTS 6,590,573 B1    7/2003    Geshwind
6,741,242 B1    5/2004    Itoh et al.
(Continued)

FOREIGN PATENT DOCUMENTS

JP    2004102526    4/2004
JP    2004334833    11/2004
(Continued)

OTHER PUBLICATIONS

Gross et al., "blue-c: A Spatially Immersive Display and 3D Video Portal for Telepresence," SIGGRAPH '03 ACM, pp. 819-827.*
(Continued)

*Primary Examiner* — Andrew G Yang
(74) *Attorney, Agent, or Firm* — Volpe and Koenig, P.C.

(57) ABSTRACT

A scene graph suitable for defining stereoscopic graphical objects, a method and an apparatus for creating such scene graphs, and a method and an apparatus for rendering graphical objects based on such scene graphs are described. The scene graph describes a spatial or a temporal arrangement of the stereoscopic graphical object and comprises information about image data for a base image for the stereoscopic graphical object, image data for a dependent image for the graphical object, and the spatial or the temporal arrangement of the base image and the dependent image. For a 3D rendering mode the graphical object is composed of the base image and the dependent image. For a 2D rendering mode the graphical object is composed of the base image only.

8 Claims, 3 Drawing Sheets

(56) References Cited

U.S. PATENT DOCUMENTS

| | | |
|---|---|---|
| 7,417,645 B2 | 8/2008 | Beda et al. |
| 2003/0223499 A1* | 12/2003 | Routhier et al. ......... 375/240.25 |
| 2004/0066846 A1* | 4/2004 | Yun ................ H04N 21/234318 |
| | | 375/240.08 |
| 2004/0184548 A1 | 9/2004 | Kerbiriou et al. |
| 2007/0257902 A1 | 11/2007 | Sato et al. |
| 2008/0303832 A1 | 12/2008 | Kim et al. |
| 2010/0021145 A1* | 1/2010 | Oashi ..................... G09G 3/003 |
| | | 386/248 |
| 2010/0150529 A1* | 6/2010 | Leichsenring ... G11B 20/00086 |
| | | 386/241 |
| 2010/0253680 A1* | 10/2010 | Kobayashi ......... H04N 13/0048 |
| | | 345/419 |
| 2011/0013884 A1 | 1/2011 | Sasaki et al. |
| 2011/0013888 A1 | 1/2011 | Sasaki et al. |
| 2011/0032327 A1 | 2/2011 | Ikeda et al. |
| 2011/0126159 A1* | 5/2011 | Ko ...................... G06F 3/04847 |
| | | 715/848 |
| 2011/0261157 A1 | 10/2011 | Kiyama |
| 2011/0292176 A1* | 12/2011 | Jung ...................... H04N 5/445 |
| | | 348/43 |

FOREIGN PATENT DOCUMENTS

| | | |
|---|---|---|
| JP | 2004537930 | 12/2004 |
| JP | 2011004411 | 1/2011 |
| KR | 1020100022640 | 3/2010 |
| WO | WO2004042659 | 5/2004 |
| WO | WO2008044191 | 4/2008 |
| WO | 2009122214 A2 | 10/2009 |
| WO | WO 2010011556 * | 1/2010 ............. H04N 13/00 |
| WO | WO2010064472 | 6/2010 |
| WO | WO2010095835 A2 * | 8/2010 ............. H04N 13/00 |

OTHER PUBLICATIONS

Wikipedia, Scene graph, Jan. 1, 2010, pp. 1-5, Retrieved from the Internet, XP007919185.

M. Zink et al.: "Programming HD DVD and Blu-ray Disc", Jan. 1, 2009 (Jan. 1, 2009), McGraw Hill, US, New York, XP002662593, ISBN: 978-0-07-149669-8 pp. 23-4-23-5, the whole document.

Anonymous: "White paper Blu-ray Disc Format: 2.B Audio Visual Application Formal Specifications for BD-ROM Version 2.4", Apr. 30, 2010 (Apr. 30, 2010). XP55007518, Retrieved from the Internet: URL.

Search Report dated Nov. 29, 2012.

Miki, "Position of MPEG-4 and Requests for Standard", The Journal of the Institute of Image Information and Television Engineers, vol. 51, No. 12, Dec. 20, 1997, pp. 1958-1965.

Ogawa et al., "Blu-ray 3DTM Technology for Full HD 3D", Panasonic Technical Journal, vol. 56, No. 4, Jan. 15, 2011, pp. 14-19. English Abstract.

Matsumoto, Masayuki, "Considering 3D in Light of Fahrenheit and OpenGL: Scene Graph Accelerating Three- Dimensional Graphics", TransTECH Shoeisha Co., Ltd, Jul. 1, 1999, pp. 56-65, vol. 8, No. 6, Japan.

* cited by examiner

SCENE GRAPH FOR DEFINING A STEREOSCOPIC GRAPHICAL OBJECT

This application claims the benefit, under 35 U.S.C. § 365 of International Application PCT/EP2012/054761, filed Mar. 19, 2012, which was published in accordance with PCT Article 21(2) on Oct. 4, 2012 in English and which claims the benefit of European patent application No. 11305373.0, filed Mar. 31, 2011.

The present invention relates to a scene graph suitable for defining stereoscopic graphical objects, to a method and an apparatus for creating such scene graphs, and to a method and an apparatus for rendering graphical objects based on such scene graphs. Furthermore, the invention relates to a storage medium comprising a scene graph for defining a stereoscopic graphical object. Finally, the invention relates to a method for initializing a rendering module and a storage medium comprising an application adapted to perform this method.

User interfaces or other graphical objects are often described by a scene graph. In general, such a scene graph describes—usually in a hierarchical manner, e.g. a tree structure—how graphical elements are arranged in space and time to compose scenes. A prominent example of a scene graph is the hypertext markup language HTML, as used for web pages in the internet. A scene graph can be created with the help of visual design software. At runtime, software capable of interpreting the scene graph renders it on the screen. For example, in case of HTML, rendering is performed by the internet browser.

One basic advantage of such a system is that the scene graph or the user interface can be generated relatively easy with the help of visual design software tools. Another advantage is that the scene graph is usually platform-independent. Only the rendering software depends on the platform.

Today's scene graph based systems are either monoscopic only or, in case of more complex systems, describe geometric 3-dimensional worlds, as e.g. known from computer games.

Recently, the Blu-ray Disc Association has published stereoscopic 3D extensions to their pre-recorded format. The format not only allows to store stereoscopic 3D video on the Blu-ray disc, it also supports creation of stereoscopic 3D user interfaces, for example 3D pop-up menus. The Blu-ray 3D format is designed to enable backwards compatibility. The goal is that when authored properly, the same Blu-ray disc should be playable in 3D mode on a 3D Blu-ray player and in 2D mode on a standard 2D player.

Mainly two problems arise with regard to such stereoscopic 3D user interfaces. The first problem is how to efficiently create such stereoscopic user interfaces. The second problem is how to efficiently create the user interfaces for both stereoscopic 3D mode as well as for 2D mode.

A straightforward option would be to create a stereoscopic 3D version of the user interface as well as a monoscopic 2D version in the authoring process. This approach has the disadvantage that additional effort is needed, i.e. it is rather inefficient.

A further option would be to make use of model virtual 3D worlds in form of full-fledged 3-dimensional scene graphs, as known from computer games. Such an approach is also capable of rendering a 2D version as well as a stereoscopic version of the scene. However, the computational cost of such an approach is quite high and usually requires some hardware acceleration support, e.g. 3D graphics acceleration of modern computer graphics adapters. Such processing power is typically not available on consumer electronics devices.

It is an object of the present invention to propose a solution for an efficient creation of user interfaces that can be rendered in 3D and in 2D with low processing cost.

According to the invention, this object is achieved by a method for creating a scene graph for a stereoscopic graphical object, the scene graph describing a spatial and/or temporal arrangement of the stereoscopic graphical object, comprises the steps of:
 specifying a base image and a dependent image for the stereoscopic graphical object;
 specifying a spatial and/or temporal arrangement of the base image and the dependent image; and
 arranging information about image data for the base image, image data for the dependent image, and the spatial and/or temporal arrangement of the base image and the dependent image in a scene graph.

Likewise, an apparatus for creating a scene graph for a stereoscopic graphical object, the scene graph describing a spatial and/or temporal arrangement of the stereoscopic graphical object, comprises:
 means for specifying a base image and a dependent image for the stereoscopic graphical object;
 means for specifying a spatial and/or temporal arrangement of the base image and the dependent image; and
 means for arranging information about image data for the base image, image data for the dependent image, and the spatial and/or temporal arrangement of the base image and the dependent image in a scene graph.

Similarly, a scene graph for a stereoscopic graphical object, the scene graph describing a spatial and/or temporal arrangement of the stereoscopic graphical object, wherein the scene graph comprises information about image data for a base image for the stereoscopic graphical object, image data for a dependent image for the graphical object, and the spatial and/or temporal arrangement of the base image and the dependent image.

Accordingly, a storage medium comprises a scene graph for a stereoscopic graphical object, the scene graph describing a spatial and/or temporal arrangement of the stereoscopic graphical object, wherein the scene graph comprises information about image data for a base image for the stereoscopic graphical object, image data for a dependent image for the stereoscopic graphical object, and the spatial and/or temporal arrangement of the base image and the dependent image.

For rendering the stereoscopic graphical object in 3D the graphical object is composed of the base image and the dependent image. For rendering the stereoscopic graphical object in 2D the graphical object is composed of the base image only.

A first aspect of the invention is the definition of a 'stereoscopic' scene graph, i.e. a scene graph that is particularly suited to describe stereoscopic graphical objects, e.g. stereoscopic user interfaces. Such stereoscopic graphical objects may be provided, for example, on Blu-ray 3D discs. The proposed scene graph is particularly suited for automatically deriving a 2D-representation from a stereoscopic graphical object by using only the specified base image. This makes the scene graph useful for heterogeneous 3D/2D playback systems. When creating 3D/2D compatible content, e.g. a 3D Blu-ray disc, the content author is freed from creating one graphical object for stereoscopic 3D mode and another graphical object for monoscopic 2D mode. Typically, an authoring system will provide a graphical user interface for defining or generating the base image and the dependent image.

Advantageously, the image data for the base image is contained in a base image mosaic and/or the image data for the dependent image is contained in a dependent image mosaic. Image mosaics allow to reduce loading times and improve the player performance, as a plurality of images needed to generate a menu or the like are referenced in a single resource. By ensuring that the image mosaics contain only image data for base images and only image data for dependent images it is guaranteed that no resources are loaded that, to at least some extent, contain images that are not needed for the current rendering mode. The image mosaics will generally be generated by a dedicated software, which optimizes the distribution of the selected images into different image mosaics.

According to a further aspect of the invention, a method for rendering a stereoscopic graphical object comprises the steps of:

retrieving a scene graph, which comprises information about image data for a base image and image data for a dependent image for the stereoscopic graphical object as well as a spatial and/or temporal arrangement of the base image and the dependent image;

for rendering a stereoscopic version of the stereoscopic graphical object, retrieving the image data for the base image and the image data for the dependent image and composing the stereoscopic graphical object of the base image and the dependent image in accordance with the spatial and/or temporal arrangement specified in the scene graph; and for rendering a monoscopic version of the stereoscopic graphical object, retrieving the image data for the base image and composing the stereoscopic graphical object of the base image only in accordance with the spatial and/or temporal arrangement specified in the scene graph.

Similarly, an apparatus for rendering a stereoscopic graphical object comprises:

means for retrieving a scene graph, which comprises information about image data for a base image and image data for a dependent image for the stereoscopic graphical object as well as a spatial and/or temporal arrangement of the base image and the dependent image;

means for retrieving the image data for the base image and the image data for the dependent image and composing the stereoscopic graphical object of the base image and the dependent image in accordance with the spatial and/or temporal arrangement specified in the scene graph for rendering a stereoscopic version of the stereoscopic graphical object; and means for retrieving the image data for the base image and composing the stereoscopic graphical object of the base image only in accordance with the spatial and/or temporal arrangement specified in the scene graph for rendering a monoscopic version of the stereoscopic graphical object.

The second aspect of the invention is related to a rendering method and apparatus, which make use of the scene graph, the base image, and the dependent image. The method and the apparatus are capable of rendering the stereoscopic graphical object as specified by the scene graph in 3D mode as well as in 2D mode. An important advantage of the proposed scene graph is that it is capable of being efficiently rendered either in stereo 3D mode or in monoscopic 2D mode. This makes the scene graph very useful for systems like Blu-ray 3D discs, where for example a stereo 3D user interface needs to be generated in stereo 3D mode when executing on a 3D player, and a monoscopic user interface when running on a system which is 2D-capable only. In case of a 2D rendering mode only the image data for the base images need to be retrieved and rendered, whereas in case of a 3D rendering mode the image data for the base images as well as the image data for the dependent images are retrieved and rendered. In this way it is ensured that no unnecessary data are loaded. Typically a transducer will retrieve the necessary images from a storage medium, e.g. an optical pickup in case of optical storage media or a reading head in case of a hard disk.

Advantageously, however, the image data for the dependent image are also retrieved in case of rendering a monoscopic version of the stereoscopic graphical object. In this regard it is preferably determined whether a 3D rendering mode is possible, i.e. if a 3D rendering mode is supported by a rendering device; and in case a 3D rendering mode is possible, the image data for the base image and the image data for the dependent image specified by the scene graph are retrieved irrespective of an actual rendering mode.

In other words, in case of a 2D rendering mode it is checked whether a 3D rendering mode would actually be possible. For example, a 3D player connected to a 3D display may be set to a 2D rendering mode, though a 3D rendering mode would be possible. In this case the image data for the dependent images are favorably loaded even though they are no needed for the current rendering mode. However, in case the user decides to switch to 3D rendering mode, all necessary images are already available. Hence, switching from a 2D rendering mode to a 3D rendering mode is accomplished very fast.

In case the available dependent images have not necessarily been retrieved, upon a transition from a 2D rendering mode to a 3D rendering mode, it is determined whether specified image data for a dependent image has already been retrieved. If the image data for the dependent image has not yet been retrieved, it is subsequently retrieved in order to enable rendering of the graphical object in a 3D rendering mode. In this way it is ensured that in addition to the base images all necessary dependent images are available for rendering.

According to a further aspect of the invention, a method for initializing a rendering module, which is switchable between a 3D rendering mode and a 2D rendering mode, and whose output is fed to a graphics subsystem, comprises the steps of:

determining whether stereoscopic content is to be rendered;

determining whether the graphics subsystem is capable of rendering in stereoscopic mode; and in case the graphics subsystem is capable of rendering in stereoscopic mode, initializing the rendering module independent of a current rendering mode of the graphics subsystem.

In order to implement the above method, an application adapted to perform the necessary steps is advantageously stored on a storage medium. The application also includes the rendering module, which is switchable between the 3D rendering mode and the 2D rendering mode.

Usually an 2D rendering module is available in addition to the switchable rendering module. In case the current rendering mode is a 2D mode according to the prior art the 2D rendering module is initialized. In contrast, according to the invention the switchable rendering module is initialized irrespective of the actual current rendering mode in case the graphics subsystem is capable of rendering in stereoscopic mode. In this way it is ensured that in case of switching from the 2D mode to a 3D mode 3D rendering can start immediately without the need to first terminate the 2D rendering module and initialize the switchable rendering module.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 1 illustrates a process for rendering a graphical element of a scene graph in different output modes;

FIG. 2 schematically depicts an image mosaic;

In order to define graphical objects that can be efficiently rendered in stereo 3D mode and in 2D mode, a 'stereoscopic' scene graph is defined. The proposed scene graph specifies and uses stereo pairs of images. Similar stereo pairs form the basis of stereoscopic 3D. One image is intended for the left eye and another image is intended for the right eye. One image of a stereo pair represents a 'base image' (BI). The other image represents a 'dependent image' (DI). The base image is mandatory, whereas the dependent image is optional.

There are many possibilities to define such a stereo pair. In the following three examples shall be described. Of course, the invention is not limited to these examples. Example 1 illustrates a first exemplary definition of a stereo pair, which uses XML as a declarative language.

EXAMPLE 1

```
<img id="ibgd" stereo_idref="ibgd_r">
  <file src="bgd_l.jpg"/>
</img>
<img id="ibgd_r">
  <file src="bgd_r.jpg"/>
</img>
```

The <img> element defines an image element. Each such image element carries a unique identifier, specified in the 'id' attribute of the <img> element. In this example, the <file> element defines the source of the image data. Among others, this can simply identify a file on some local file system. The above example defines two images named 'ibgd' and 'ibgd_r'. Furthermore, 'ibgd' carries a 'stereo_idref' attribute. This attribute links the two images to form a stereo pair.

Such a stereo pair can be conveniently used as follows:

```
<layer id="lb" clipWidth="500" clipHeight="200" z="0">
  <graphic id="gback" idref="ibgd" x="20" y="20" z="10"/>
</layer>
```

Here, a graphic is placed inside a layer at position x=20, y=20, z=10. The image resource to be used is identified through the 'idref' attribute. In this example, it refers to the stereo pair defined above in Example 1.

Example 2 illustrates a second exemplary definition of a stereo pair, which also uses XML as a declarative language.

EXAMPLE 2

<img id="ibgd" src="bgd_l.jpg" src_r="bgd_r.jpg"/>

The <img> element defines an image element. It carries a unique identifier, specified in the "id" attribute. In this example, the 'scr' attribute defines the source image data for one image of the stereo pair. The 'src_r' attribute defines the source image data for the other image of the stereo pair.

Example 3 illustrates a third exemplary definition of a stereo pair. This example uses HTML as a declarative language.

EXAMPLE 3

<img src="bgdl.jpg" src_r="bgdr.jpg">

In HTML, the 'src' attribute of an <img> element defines the data source for the image. A new attribute 'src_r' defines the data source of the associated second image to form a stereo pair.

Figure 1:
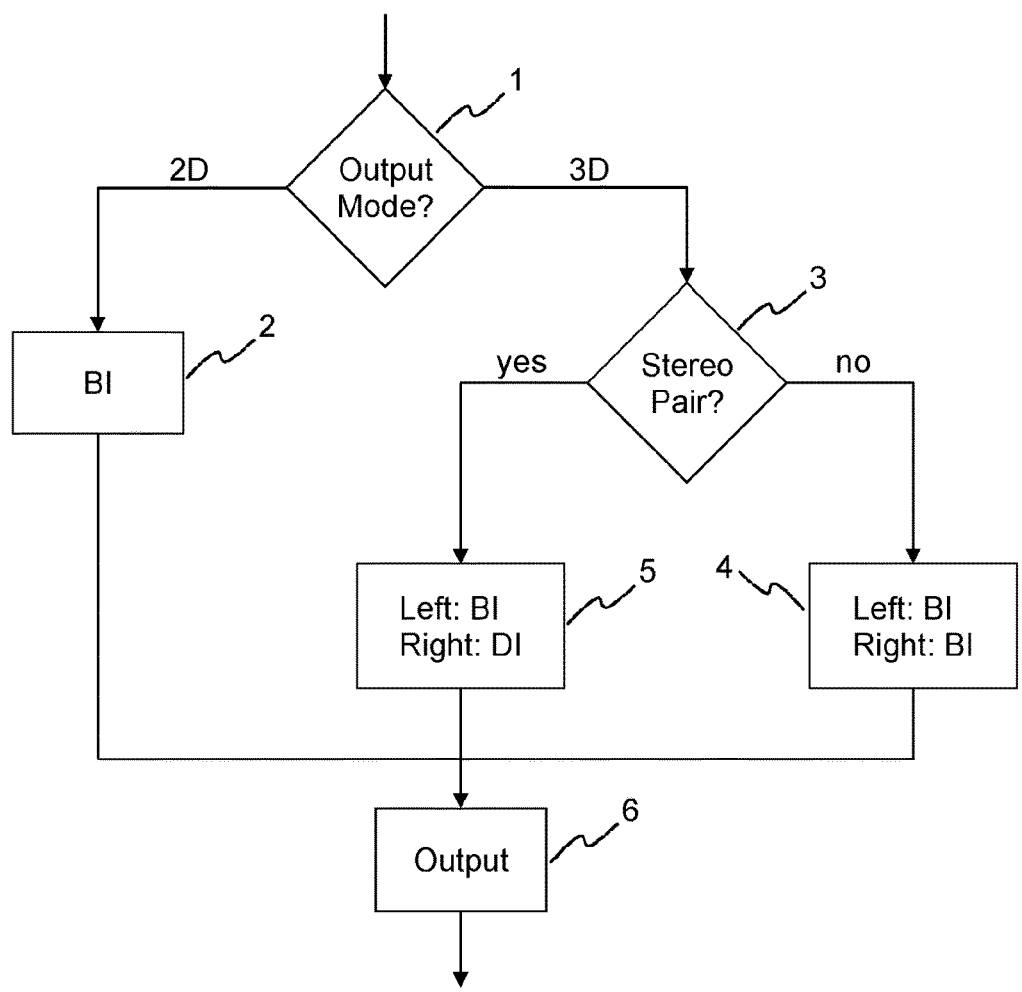

In order to specify how to render a graphical element of a scene graph in the different output modes, rules are defined. This is schematically illustrated in FIG. 1. In a first decision step 1, it is detected whether 2D output or stereo 3D output is to be generated. In 2D output mode, the mandatory base image BI is used for compositing 2 the graphical object. In stereo 3D output mode, a second decision step 3 detects whether the image to be rendered is a stereo image, i.e. whether in addition to the mandatory base image BI, a dependent image DI is declared. In case the image is a monoscopic image only, the base image BI is used for compositing 4 the left channel output as well as the right channel output. In case of a stereo image, the base image BI is used for compositing 5 the left channel output and the dependent image DI is used for compositing the right channel output. The stereoscopic graphical object composited in the compositing steps 2, 4, 5 is then output 6 for display.

Figure 2:
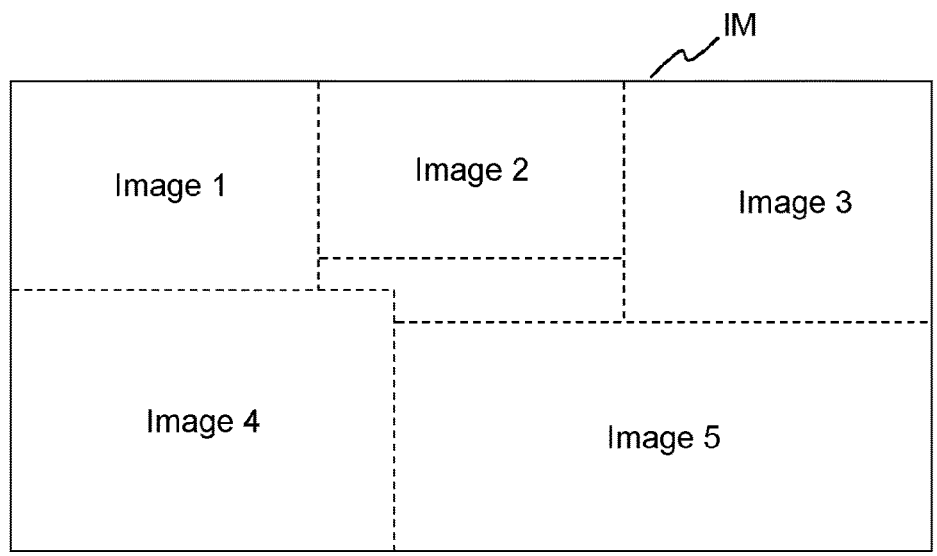

For resource-constrained systems like consumer electronics devices, e.g. Blu-ray players, the image resources to be used by a Java application or the like are usually stored in 'image mosaics' (IM). Such image mosaics IM combine a number of elementary images into a larger image. This is exemplarily illustrated in FIG. 2. This technique decreases the time required to decode all the images at runtime, because each image decoding process includes some runtime overhead to set up the image decoder. Combining elementary images into an image mosaic IM avoids frequent set ups of the image decoder and the associated extra time.

In order to enhance the efficiency of the proposed approach using stereo pairs, it is beneficial if one particular image mosaic IM does not combine one or more base images BI with one or more dependent images DI. This means that the set of base images BI is preferably combined into one or more image mosaics IM, so called base image mosaics (BI-IM), whereas the set of dependent images DI is combined separately into one or more different image mosaics IM, so called dependent image mosaics (DI-IM).

The separation of images into base images BI and dependent images DI, or into base image mosaics BI-IM and dependent image mosaics DI-IM, allows to implement beneficial rules for an application capable of rendering the scene graph in either stereo 3D mode or 2D mode. When the application detects at runtime that rendering in 3D mode is not possible in the execution environment, e.g. the application is running on a 2D Blu-ray player or the application is running on a 3D Blu-ray player but only a non-3D screen is connected to the player, when images are to be loaded, any dependent image DI or dependent image mosaic DI-IM is ignored and only base images BI or base image mosaics BI-IM are loaded into memory as prescribed.

If, however, the application detects that stereo 3D mode is possible, the following two modes of loading image resources are preferably supported.

In the first mode, when images are to be loaded, base images BI or base image mosaics BI-IM as well as dependent images DI or dependent image mosaics DI-IM are loaded into memory as prescribed. Notably, this includes the case where 3D mode would be possible in the execution environment, but the application is currently configured or signaled to render in 2D mode. This mode has the advantage that no dependent images DI or dependent image mosaics DI-IM need to be loaded when transitioning from 2D rendering mode to 3D rendering mode, so a transition is comparably fast. This mode could be circumscribed as an 'eager loading' mode.

In the second mode, when images are to be loaded, the application detects whether the current rendering mode is 3D or 2D. In case of 3D rendering mode, base images BI or base image mosaics BI-IM as well as dependent images DI or dependent image mosaics DI-IM are loaded into memory. In case of 2D mode, only base images BI or base image mosaics BI-IM are loaded. Further, in this mode, when transitioning from 2D rendering mode to 3D rendering mode, necessary dependent images DI or dependent image mosaics DI-IM are loaded as needed. This mode could be circumscribed as a 'lazy loading' mode.

Figure 3:
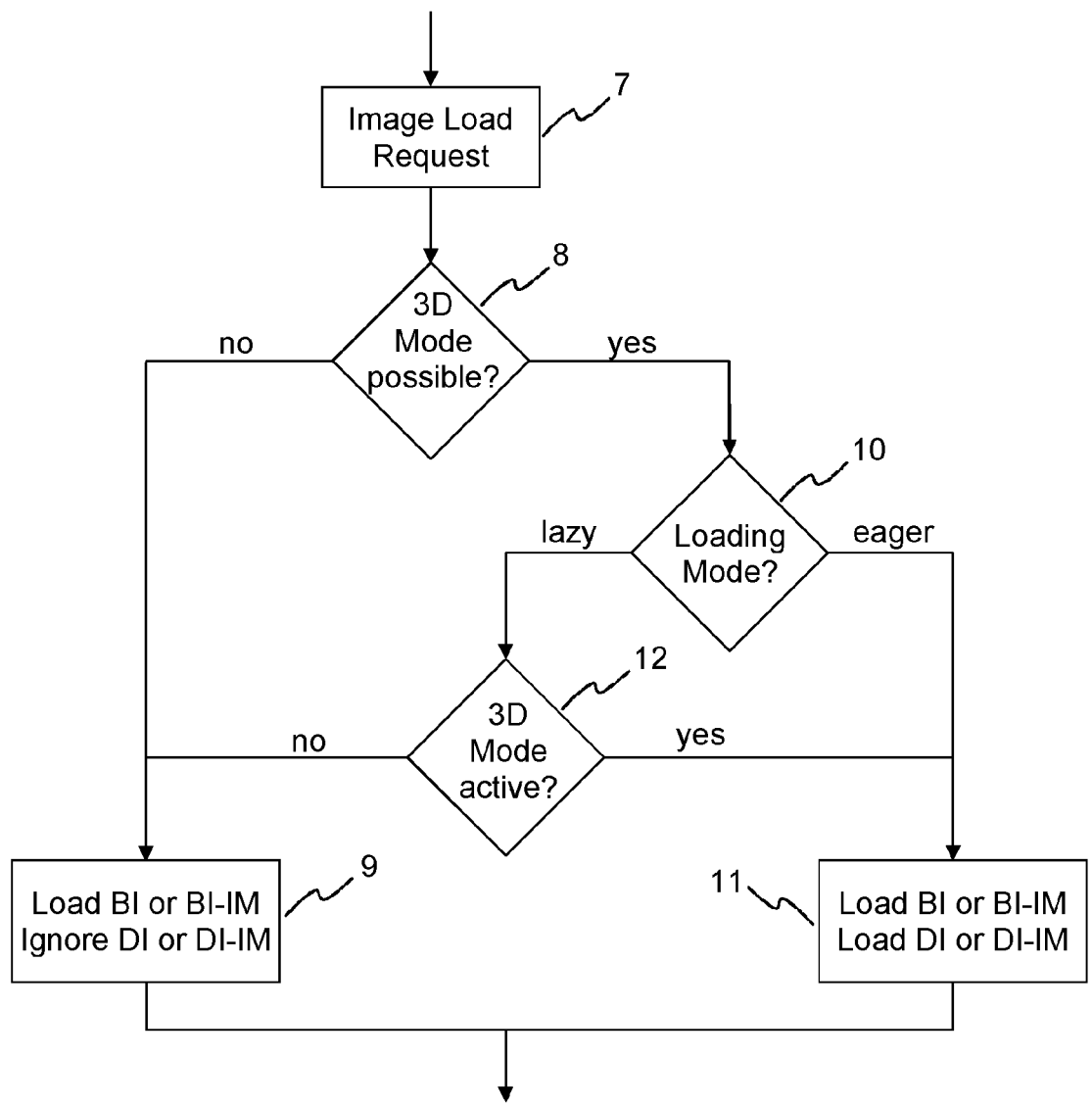
FIG. 3 shows a process of image loading during regular operation.

An exemplary process of image loading during regular operation, i.e. not caused by any mode change, is depicted in FIG. 3. Upon receipt of a request 7 to load an image it is determined 8 whether a 3D rendering mode is possible. If this is not the case, only a base image BI or a base image mosaic BI-IM is loaded 9 and any dependent image DI or dependent image mosaic DI-IM is ignored. If, however, a 3D rendering mode is possible, the further process depends on the loading mode. Therefore, in a further decision step 10 the loading mode is determined. Of course, the further decision step 10 can be omitted when the loading mode is fixed for a specific implementation. In case of an eager loading mode, a base image BI or a base image mosaic BI-IM as well as a dependent image DI or dependent image mosaic DI-IM is loaded 11. In case of a lazy loading mode, it is determined 11 whether the 3D rendering mode is active. If this is not the case, only a base image BI or a base image mosaic BI-IM is loaded 9 and any dependent image DI or dependent image mosaic DI-IM is ignored. If, however, the 3D rendering mode is active, a base image BI or a base image mosaic BI-IM as well as a dependent image DI or dependent image mosaic DI-IM is loaded 11.

Figure 4:
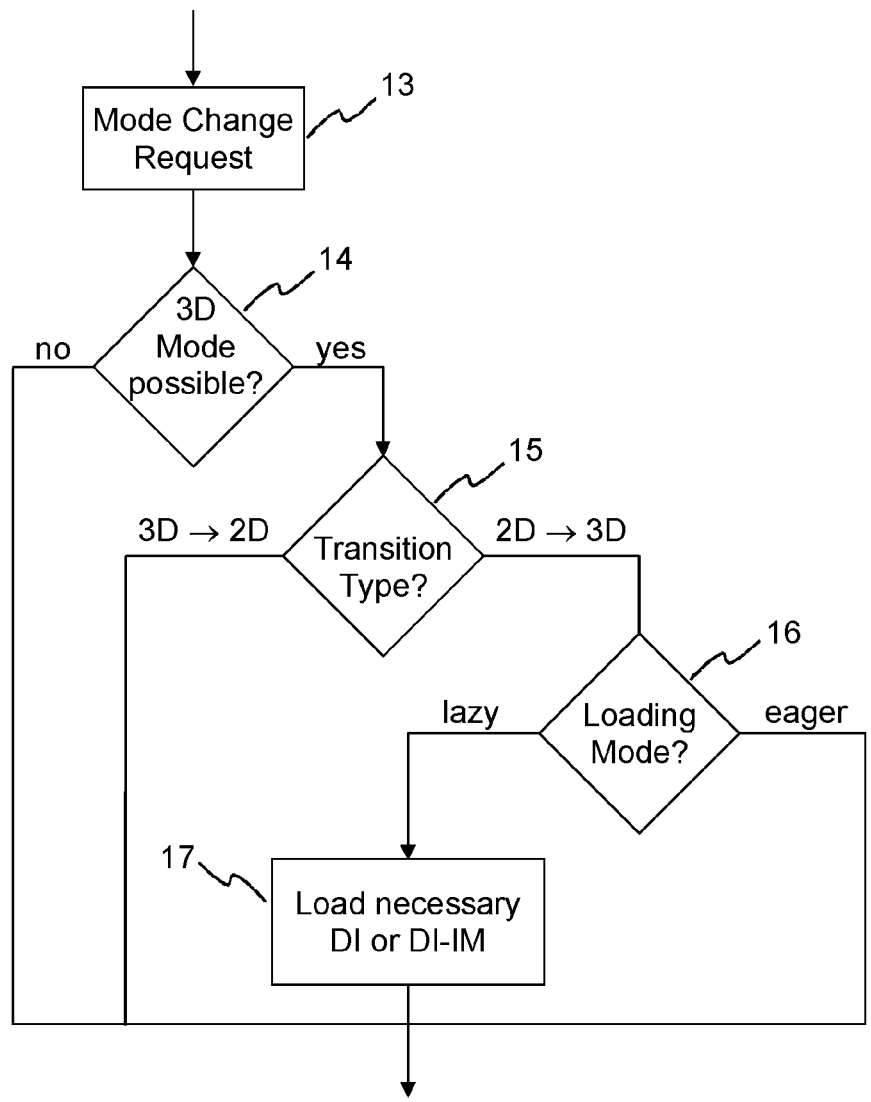
FIG. 4 depicts an exemplary process of image loading upon switching of the rendering mode.

An exemplary process of image loading upon switching of the rendering mode is shown in FIG. 4. Upon receipt of a mode change request 13 it is determined 14 whether currently a 3D rendering mode is possible. If this is not the case, no further steps need to be performed. If, however, a 3D rendering mode is possible, the further process depends on the transition type. Therefore, in a further decision step 15 the transition type is determined. In case of a transition from 3D rendering mode to 2D rendering mode, no further steps need to be performed as all necessary base images BI or base image mosaics BI-IM have already been loaded before for 3D rendering. In case of a transition from 2D rendering mode to 3D rendering mode, the further process depends on the loading mode that has been used before for in response to the image load request 7 of FIG. 3. Consequently, in yet a further decision step 16 the previously used loading mode is determined. Of course, the further decision step 16 can be omitted when the loading mode is fixed for a specific implementation. In case an eager loading mode has been used, no further steps need to be performed as all necessary dependent images DI or dependent image mosaics DI-IM have already been loaded before. In case a lazy loading mode has been used, the necessary dependent images DI or dependent image mosaics DI-IM are loaded 17.

The part of an application which is capable of rendering a scene graph is a graphics rendering module. Such an application is typically provided on a storage medium together with the content to be reproduced. A typical task of the graphics rendering module is 'double-buffering', i.e. a technique where an application draws the next composition into an invisible back buffer, while the current composition is stored in a front buffer connected to the display. When requested, the graphics rendering module copies the content of the back buffer into the front buffer. The double buffering technique avoids that intermediate compositions get visible on the display, which potentially causes flicker.

For stereoscopic 3D, such a graphics rendering module needs two pipelines, each connected to one back buffer. One back buffer is needed for compositing the left channel output, whereas another back buffer is needed for compositing the right channel output.

Such stereo graphics rendering module can be designed to support stereoscopic 3D rendering as well as 2D rendering. In the latter case, one of the two pipelines is used to generate the 2D output while the other pipeline remains unused. Further, the stereo 3D graphics rendering module can be designed to support dynamic mode switches between stereo 3D rendering and monoscopic 2D rendering. This means that a stereo 3D graphics renderer as outlined above is very flexible.

However, a stereo 3D rendering module allocates two back buffers, each allocating a considerable amount of the image memory. In case of a Blu-ray player, such a back buffer allocates almost 8 MB of image memory for a resolution of 1920×1080 pixels. As in consumer electronics devices image memory is usually limited, preferably the following beneficial rules for an application capable of rendering the stereoscopic scene graph in either stereo 3D mode or 2D mode are implemented.

When the application detects at runtime that rendering in 3D mode is not possible in the execution environment, e.g. because the application is running on a 2D Blu-ray player or the application is running on a 3D Blu-ray player but only a non-3D screen is connected to the player, the application creates and activates a graphics renderer implementation which is capable of rendering in 2D mode only. Such an implementation embeds a single pipeline only, and hence allocates memory to hold only a single back buffer.

When the application detects that stereo 3D mode is possible in the execution environment, the application creates and activates a graphics renderer implementation which is capable of rendering in 3D mode and in 2D mode. Notably, the application only detects that 3D mode is technically possible. This does not mean that 3D mode is activated.

From the stereoscopic scene graph, effective 'x', 'y' and 'z' parameters for positioning graphical objects on the screen can be derived. For monoscopic 2D rendering, 'x' determines the position in horizontal direction, 'y' determines the position in vertical direction, and 'z' usually only specifies in-front-of/behind relationships between individual elements, i.e. the composition order. For stereoscopic rendering, similar to monoscopic 2D rendering mode, 'z' is used to determine the composition order of individual elements in the scene graph.

The invention claimed is:

1. A method for generating a stereoscopic graphical object, the method comprising:
receiving a user input specifying a base image and a dependent image to be used for generating the stereoscopic graphical object;
receiving a user input specifying a spatial and a temporal arrangement of image data of the base image and the dependent image to be used for generating the stereographic graphical object;
arranging information about image data for the base image, image data for the dependent image, and the spatial and the temporal arrangement of the base image and the dependent image in a scene graph; and
storing the image data for the base image, the image data for the dependent image, and the scene graph on a non-transitory storage medium,
wherein the scene graph specifies:
a first arrangement of the image data for the base image for generating a monoscopic version of the stereoscopic graphical object;
a second arrangement of the image data of the base image and the image data of the dependent image for generating a stereoscopic version of the stereoscopic graphical object;
the scene graph enabling switchable rendering between the stereoscopic version of the stereoscopic graphical object and the monoscopic version of the stereoscopic graphical object without re-initializing a graphics rendering module.

2. The method according to claim 1, further comprising:
arranging the image data for the base image in a base image mosaic or arranging the image data for the dependent image in a dependent image mosaic; and
storing the base image mosaic and the dependent image mosaic on the non-transitory storage medium.

3. An apparatus for generating a stereoscopic graphical object, wherein the apparatus is configured to:
receive a user input specifying a base image and a dependent image to be used for generating the stereoscopic graphical object;
receive a user input specifying a spatial and a temporal arrangement of image data of the base image and the dependent image to be used for generating said stereoscopic graphical object;
arrange information about image data for the base image, image data for the dependent image, and the spatial and the temporal arrangement of the base image and the dependent image in a scene graph; and
store the image data for the base image, the image data for the dependent image, and the scene graph on the non-transitory storage medium,
wherein the scene graph specifies:
a first arrangement of the image data for the base image for generating a monoscopic version of the stereoscopic graphical object;
a second arrangement of the image data of the base image and the image data of the dependent image for generating a stereoscopic version of the stereoscopic graphical object
the scene graph enabling a switchable rendering between the stereoscopic version of the stereoscopic graphical object and the monoscopic version of the stereoscopic graphical object absent without re-initializing a graphics rendering module.

4. The apparatus according to claim 3, wherein the apparatus is further configured to:
arrange the image data for the base image in a base image mosaic and to arrange the image data for the dependent image in a dependent image mosaic; and
store the base image mosaic and the dependent image mosaic on the non-transitory storage medium.

5. A method for initializing a rendering module, which is switchable between a 3D rendering mode and a 2D rendering mode, and whose output is fed to a graphics subsystem, the method comprising:
determining whether rendering in the 3D rendering mode is possible in an execution environment of the rendering module; and
on a condition that rendering in the 3D rendering mode is possible in the execution environment of the rendering module, initializing the rendering module independent of a current rendering mode of the graphics subsystem by allocating a first back buffer to generate a 3D output and a second back buffer to generate a 2D output in a memory for the rendering module,
wherein re-initialization of the rendering module is unnecessary when switching between the 3D rendering mode and the 2D rendering mode.

6. The method of claim 5, wherein the first and second back buffers are allocated during 2D rendering mode when the 3D rendering mode is possible.

7. A non-transitory storage medium comprising an application including a rendering module, which is switchable between a 3D rendering mode and a 2D rendering mode, and whose output is to be fed to a graphics subsystem, wherein the application is configured to perform:
determining whether rendering in the 3D rendering mode is possible in an execution environment of the rendering module; and
on a condition that rendering in the 3D rendering mode is possible in the execution environment of the rendering module, initializing the rendering module independent of a current rendering mode of the graphics subsystem by allocating a first back buffer for generating a 3D output and a second back buffer for generating a 2D output in a memory for the rendering module,
wherein re-initialization of the rendering module is unnecessary when switching between the 3D rendering mode and the 2D rendering mode.

8. The non-transitory storage medium according to claim 7, wherein the first and second back buffers are allocated during 2D rendering mode when the 3D rendering mode is possible.

* * * * *